United States Patent [19]

Choi

[11] Patent Number: 5,511,056
[45] Date of Patent: Apr. 23, 1996

[54] DISK TRAY FOR A MINI DISK PLAYER HAVING A GUIDE SYSTEM FOR AUTOMATICALLY LOADING A MINI-DISK CARTRIDGE

[75] Inventor: Young S. Choi, Seoul, Rep. of Korea

[73] Assignee: Daewoo Electronics Co., Ltd., Seoul, Rep. of Korea

[21] Appl. No.: 281,645

[22] Filed: Jul. 28, 1994

[30] Foreign Application Priority Data

Jul. 20, 1993 [KR] Rep. of Korea ...................... 93-14685
Jul. 30, 1993 [KR] Rep. of Korea ...................... 93-14686

[51] Int. Cl.⁶ .................................................. G11B 17/04
[52] U.S. Cl. ................................................... 369/77.2
[58] Field of Search ............................... 369/75.2, 77.1, 369/77.2; 360/96.5

[56] References Cited

U.S. PATENT DOCUMENTS 5,181,197  1/1993  Sugie et al. .............................. 369/75.2
5,237,555  8/1993  Tsuruta et al. .......................... 369/77.2
5,301,176  4/1994  Kawachi et al. ........................ 369/77.2
5,327,412  7/1994  Lee .......................................... 369/75.2

Primary Examiner—Stuart S. Levy
Assistant Examiner—George J. Letscher
Attorney, Agent, or Firm—Nixon & Vanderhye

[57] ABSTRACT

A disk tray for mini disk player has a tray cover having a rack formed therein. When the disk tray moves, the tray cover opens or closes automatically a mini disk accommodating recess by the cooperation of a moving plate, a double gear, and a first pinion. The disk tray is guided precisely between a reproduction position and an ejection position by protrusions of a tray holder protruding though holes of a driving plate, a side plate, and an elevator plate. By using the disk tray, a loading of a mini disk cartridge is possible and a reliable loading of mini disk cartridge is guaranteed with a simple construction.

2 Claims, 5 Drawing Sheets

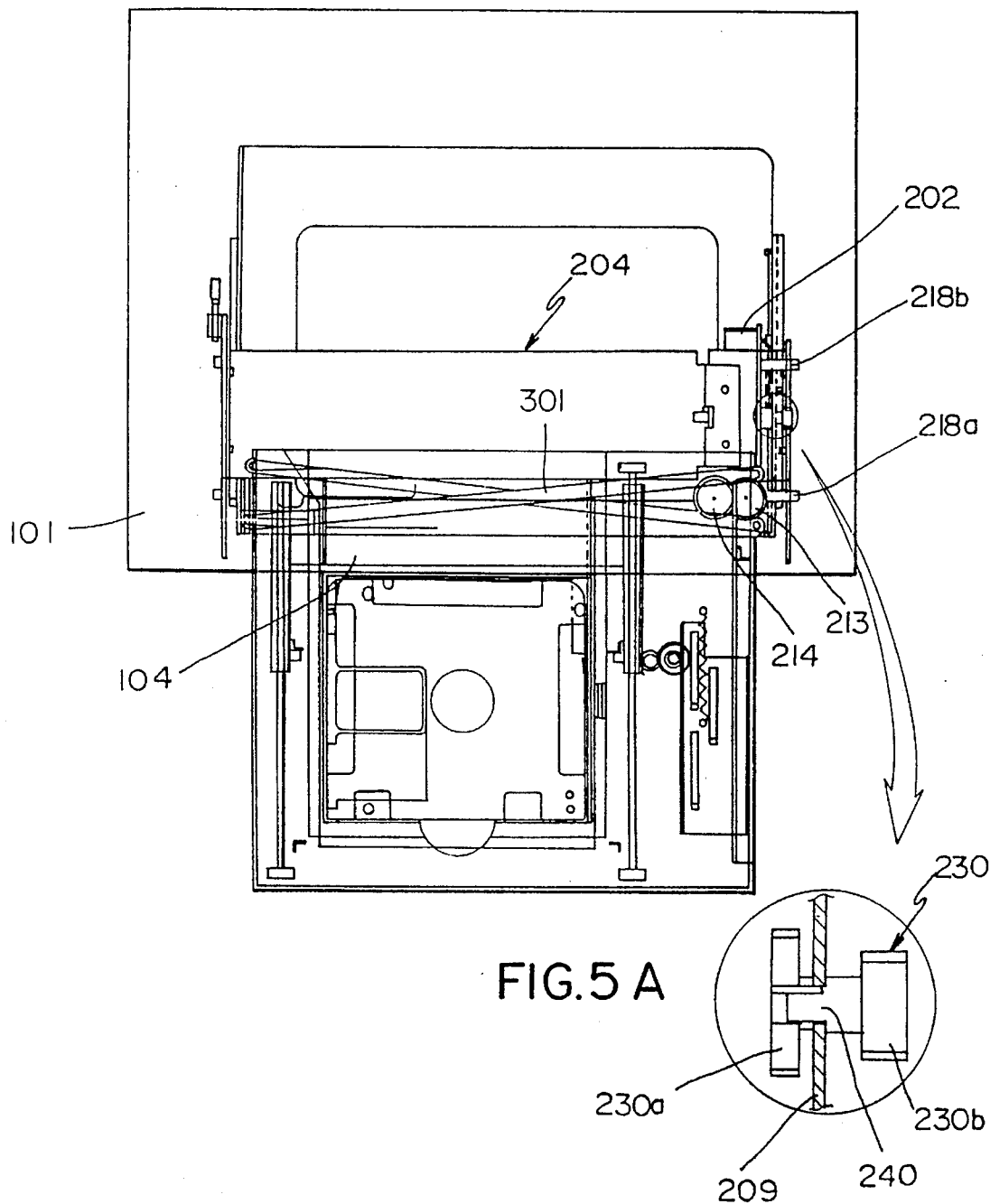

DISK TRAY FOR A MINI DISK PLAYER HAVING A GUIDE SYSTEM FOR AUTOMATICALLY LOADING A MINI-DISK CARTRIDGE

BACKGROUND OF THE INVENTION

1. Field of the Invention

The present invention relates to a disk tray, and more particularly to a disk tray for a mini disk player having a system for guiding a mini disk cartridge to be loaded precisely, and which enables automatic loading of a mini disk cartridge.

2. Prior Arts

A disk player is a device for recording a magnetic or photo record on or reproducing it from a disk. Various methods of loading a disk cartridge on or unloading it from a disk player have been developed, as a method among which various disk players, in which a disk cartridge is loaded or unloaded by a disk tray of draw type, have been developed.

U.S. Pat. No. 4,794,583 issued to Funabashi et al. and U.S. Pat. No. 4,825,429 issued to Matsumoto disclose examples of the above described disk tray of draw type.

Funabashi et al.'s disk loader comprises a pair of retainers, in which a disk tray is guided by means of racks formed at the disk tray and each of the retainers, and pinions between the disk tray and each retainer.

However, Funabashi et al.'s disk is not proper as a disk tray for a mini disk player, considering the space the retainers and pinions take. Further, Funabashi et al. discloses only a system for guiding the movement of the disk tray and does not consider systems for accommodating and holding a disk cartridge, opening or closing a shutter, etc.

Meanwhile, Mastumoto's recording medium driving device comprises a disk tray with which a detachable rack is interlocked. The device enables a dual operation that the rack is interlocked or separated with the tray, and thereby the possibility of separation of the rack in guiding the disk tray is prevented so that damage due to wrong operation can be prevented.

However, the manufacture and fabrication of Mastumoto's device are very difficult because the construction of the detachable rack is very complicated.

Therefore, there has been necessity for a guide system, which can guide the movement of a disk tray with certainty, and at the same time the manufacture and fabrication of which are simple.

In the meantime, in a conventional mini disk player, a disk cartridge is loaded directly or loaded in a top-loading type, and there has not been disclosed hitherto a mini disk player in which a mini disk cartridge is loaded in a front-loading type by means of a draw type disk tray.

SUMMARY OF THE INVENTION

Therefore, an object of the present invention is to provide a disk tray for a mini disk player, the construction of which is simple, by which an automatic loading of a mini disk cartridge is possible, and which comprises a guide system which assures reliable loading of a mini disk cartridge.

To achieve the above object, the present invention provides a disk tray for a mini disk player comprising:

a tray body including a mini disk accommodating recess formed at a middle part thereof, a first opening extending longitudinally near one end thereof through which a stopper fixed at a housing of the disk player protrudes, and a first, second, third and fourth pins formed at the upper surface thereof;

two first guide rails longitudinally extending at the opposite sides of the mini disk accommodating recess;

a tray cover including a cover body disposed above the mini disk accommodating recess and having retainers respectively enclosing a spring, at one side of which a head opening is formed, and a second tray cover side leg disposed at the first opening side of the cover body and having a second rack formed at the side surface thereof toward the first opening and a first tray cover side leg disposed at the opposite side of the cover body to the second tray cover side leg, which are formed incorporate with the cover body and in each of which each of the first guide rails is fitted so that the first and second tray cover legs can travel along the first guide rails;

a moving plate engaged in the first opening to move longitudinally along the first opening, and including a first rack formed at the side surface thereof toward the second rack, a fifth pin formed at the upper surface thereof, and a second, third and fourth openings through which the second, third and fourth pins respectively protrude;

a spring disposed between the first and the fifth pins;

a first double gear engaged with the first rack;

a first pinion engaged with the second rack and engaged with the first double gear; and a system for guiding the movement of the disk tray between a reproduction position and an ejection position thereof.

According to one embodiment of the present invention, the guiding system may include:

a side plate attached to and extending vertically from a lower sash of the disk player and including a second guide rail longitudinally extending at the upper end thereof, two third guide rails vertically extending respectively at the front and rear ends of the inner surface thereof, and two first holes formed at the upper parts thereof and respectively having a horizontal section and a vertical section extending vertically downward from the rear end of the horizontal section, the horizontal sections of which are in series with each other;

an elevator plate fitted in the third guide rails to be elevatable along them and including two second holes extending longitudinally in series with each other, and a third rack extending longitudinally at a lower part of the inner surface thereof;

a driving plate including an upper deck, a side wall extending vertically downward from the upper plate, hooks disposed at upper parts of the inner surface of the side wall and engaged with the second guide rail to be guided along it, two third holes formed in the side wall and respectively having a horizontal section and an inclined section extending upward from the rear end of the horizontal section with inclination thereto, and a fourth rack formed at the lower end surface of the side wall;

a tray holder including a base plate through which a pore is formed, a side wall extending at a right angle from the base plate, two protrusions protruding from the side wall respectively through each of the second holes and each of the first holes in turn to be engaged in an upper part of the inclined section of each of the third holes;

a fifth rack formed at a lower surface of one end of the disk tray;

a third double gear including an upper gear, a lower gear, and a rotation shaft incorporate with them, the upper gear being engaged with the fifth rack on the base plate, the lower gear disposed under the base plate, and the rotation shaft passing through the pore;

a third pinion disposed under the base plate to be engaged with the third rack and engaged with the third pinion; and a driving means for moving the driving plate longitudinally.

Preferably, a connection hole is formed in the side plate, and the driving system includes;

a second double gear including an inner gear in the side plate, an outer gear outside the side plate, and a rotation shaft passing through the connection hole and being incorporate with the inner and outer gears;

a second pinion engaged with the outer gear and the fourth rack outside of the side plate; and a driving motor for transmitting rotation force to the inner gear.

When the disk tray travels between an ejection position and a reproduction position, the tray cover opens or closes the mini disk cartridge accommodating recess automatically by means of the cooperation of the moving plate, the double gear and the first pinion.

Further, the travel of the disk tray is guided by the protrusions of the tray holder protruding through the holes respectively formed in the side plate, the elevator plate, and the driving plate, and thereby the disk tray can be positioned precisely at a reproduction position or an ejection position.

BRIEF DESCRIPTION OF THE DRAWINGS

The above object, and other features and advantages of the present invention will become apparent by describing the preferred embodiment of the present invention in detail hereinafter with reference to the drawings, in which:

FIGS. 5 and 5a are schematic plan views of the disk player shown in FIG. 4.

DESCRIPTION OF THE PREFERRED EMBODIMENT

Hereinafter, a more detailed description of the present invention will be given with reference to the drawings.

Figure 1:
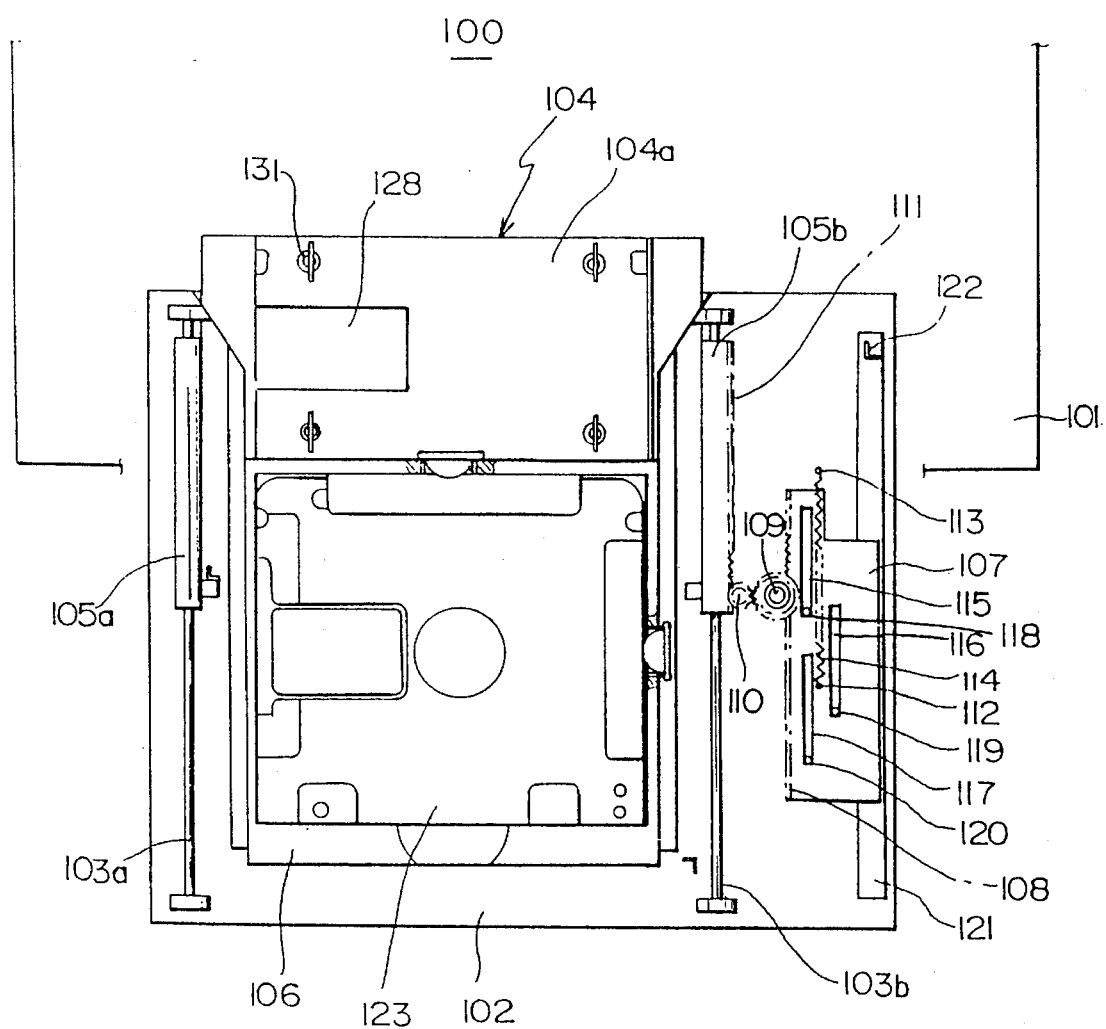
FIG. 1 is a plan view of a disk tray for a mini disk player according to one embodiment of the present invention.

FIG. 1 shows a plan construction of a mini disk tray 100 of a mini disk player according to one embodiment of the present invention. As shown, disk tray 100 comprises a mini disk accommodating recess 106 formed at a middle part of a disk tray body 102 thereof.

At the opposite sides of mini disk accommodating recess 106 are disposed first guide rails 103a and 103b, and above mini disk accommodating recess 106 is disposed a tray cover 104.

Tray cover 104 comprises a first and second tray cover side legs 105a and 105b at the opposite sides thereof, in each of which is fitted each of first guide rails 103a and 103b so that tray cover side legs 105a and 105b can travel along first guide rails 103a and 103b. A first opening 121 extending longitudinally is formed near the right side of disk tray body 102, and a stopper 122 protruding through first opening 121 is disposed at a housing 101 of the mini disk player.

A moving plate 107 is interlocked in first opening 121, and a second, third, and fourth openings 115, 116, and 117 extending longitudinally are formed in moving plate 107.

A second, third, and fourth pins 118, 119, and 120 formed on the disk tray protrude respectively through each of second, third, and fourth openings. A spring 114 is disposed between a first pin 113 formed on mini disk tray body 102 and a fifth pin 112 formed on moving plate 107.

Figure 2:
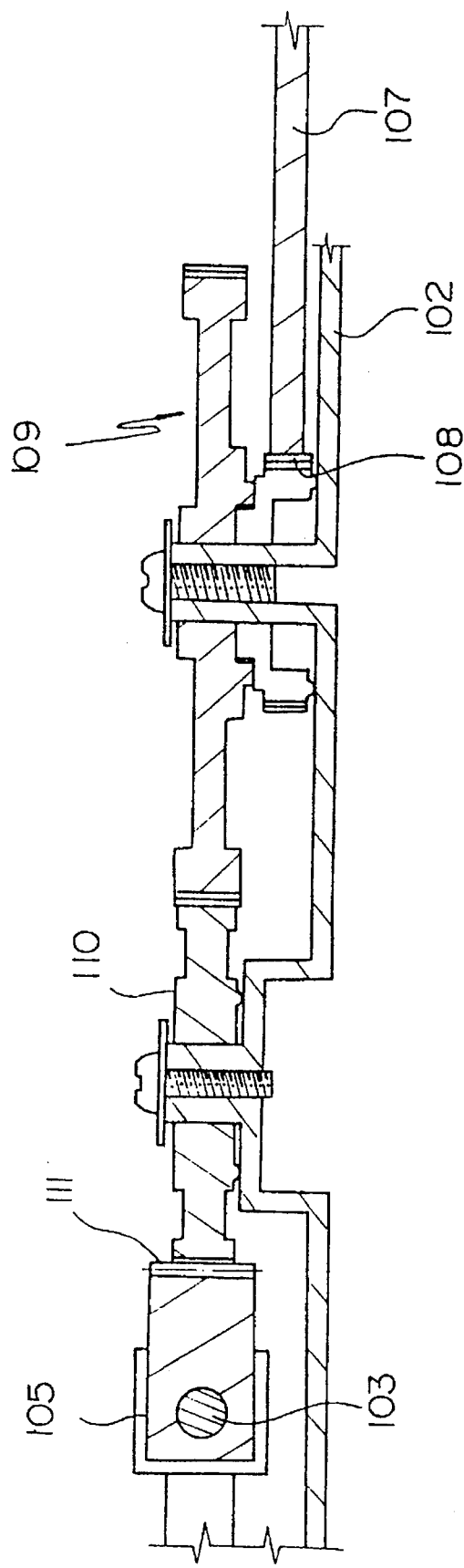
FIG. 2 is a sectional view along A—A line in FIG. 1.

A first and second racks 108 and 111 are formed respectively at the right side surface of tray cover side leg and the left side surface of moving plate 107. A first pinion 110 is engaged with the first rack 108 and a first double gear 109 with second rack 111, and first pinion 110 and a first double gear 109 are engaged with each other. The engagements of them are shown more detailedly in FIG. 2.

At four corners of a tray cover body 104a are disposed retainers 131 for urging a mini disk cartridge 123 downward by spring force of springs enclosed therein, at a left middle part of tray cover body (104a) is formed a head opening 128.

Figure 3:
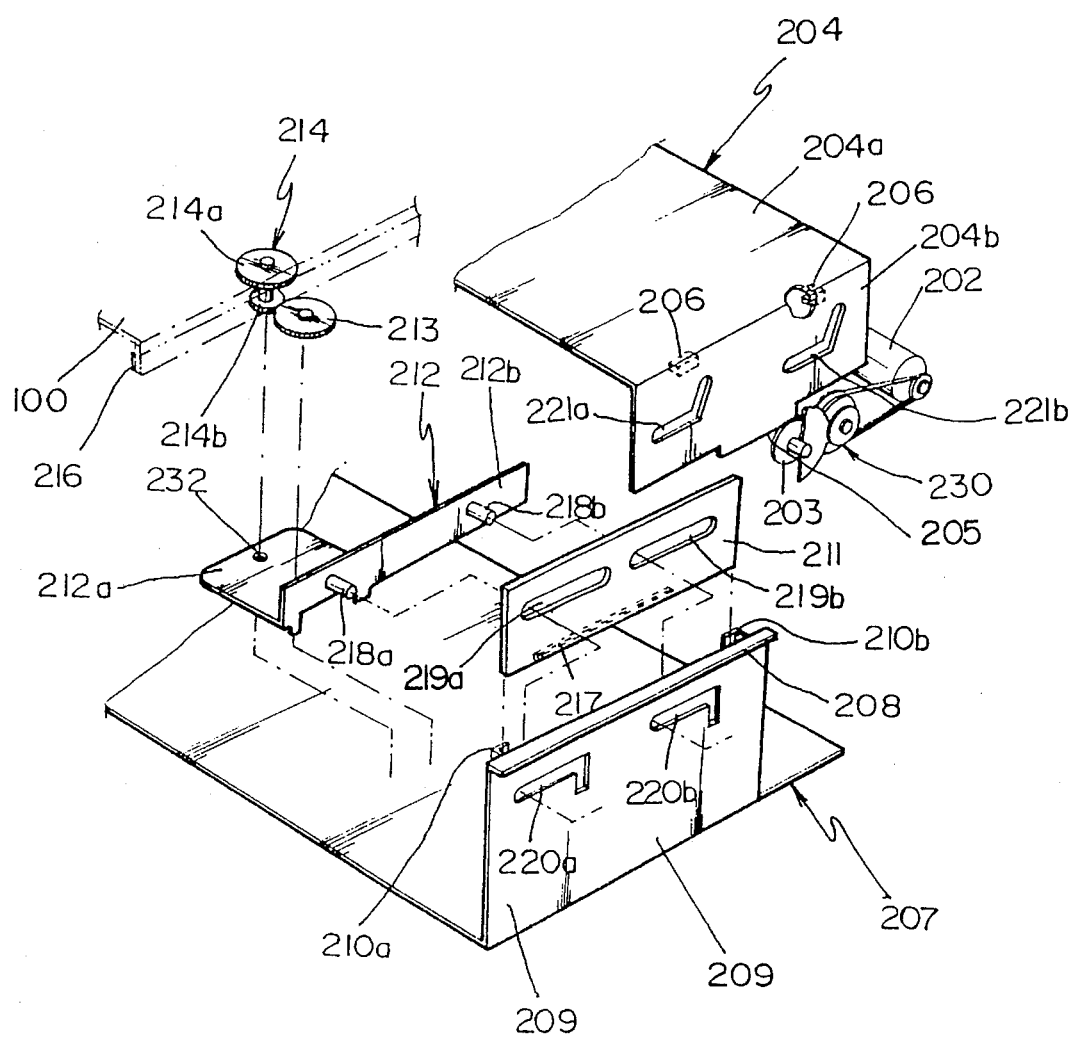
FIG. 3 is a schematic exploded view of a guide system for guiding the disk tray for a mini disk player shown in FIG. 1.

FIG. 3 shows an exploded perspective view of a guide system 200 for guiding the movement of disk tray 100 having the above described construction between a reproduction position and an ejection position.

As shown, a side plate 209 is disposed at a lower sash 207 of the disk player.

At side plate 209 are formed two first holes 220a and 220b in L shape respectively including a horizontal section and a vertical section extending vertically downward from the rear end thereof. The horizontal sections of first holes 220a are in series with each other.

A second guide rail 208 extending longitudinally is formed at the upper end of side plate 209, and third guide rails 210a and 210b extending vertically are provided at the respective inner surfaces of the front and the rear ends of side plate 209. An elevator plate 211 is engaged with third guide rails 210a and 210b to move up and down along them. Two second holes 219a and 219b extending horizontally are formed in series in elevator plate 211, and a third rack 217 extending longitudinally is formed on a lower part of the inner surface of elevator plate 211.

A moving plate 204, which comprises an upper deck 204a and a side wall 204b, is disposed outside side plate 209. In side plate 209 are formed two third holes 221a and 221b each of which comprises a horizontal section and a vertical section extending upward from the rear end of the horizontal section with inclination thereto. The horizontal sections of third holes 221a and 221b are in series with each other.

An upper part of the inner surface of side wall 204b are provided with two hooks 206 to be engaged with second guide rail 208 to guide moving plate 204.

At a middle part of the lower surface of side wall 204b is formed a fourth rack 205 which is engaged with a second pinion 203 engaged with a second double gear 230. Second double gear 230 is disposed through a connection hole 240 as shown in FIGS. 5 and 5a. That is to say, because moving plate 204 is disposed outside side plate 209, second pinion 203 for moving driving plate 204 must be disposed outside side plate 209 also, while a driving motor 202 is disposed in side plate 209. Therefore, in the second double gear 230 for transmitting the driving power between them, a rotation shaft passes through connection hole 240, inner gear 230a is disposed inside side plate 209, and outer gear 230b outside side plate 209.

In the meantime, a tray holder 212 for supporting and moving disk tray 100 is disposed inside elevator plate 211. Tray holder 212 comprises a base plate 212a and a side wall 212b.

Two protrusions 218a and 218b protrude from side wall 212b through second holes 219a and 219b and first holes 220a and 220b to be engaged in upper parts of the inclined sections of the third holes 221a and 221b. At the base plate 212a a pore 232 is formed and third double gear 214 is fitted in pore 232.

Third double gear 214 comprises an upper gear 214a and a lower gear 214b. The rotation shaft of third double gear 214 is fitted in pore 232, and the upper and lower gears 214a and 214b are disposed respectively on and under base plate 212a. Meanwhile, a third pinion 213 is disposed between lower gear 214b and third rack 217, which are respectively engaged with each of them and fixed to tray holder 213.

Upper gear 214a is engaged with a fifth rack formed at the right side of disk tray body 102.

Figure 4:
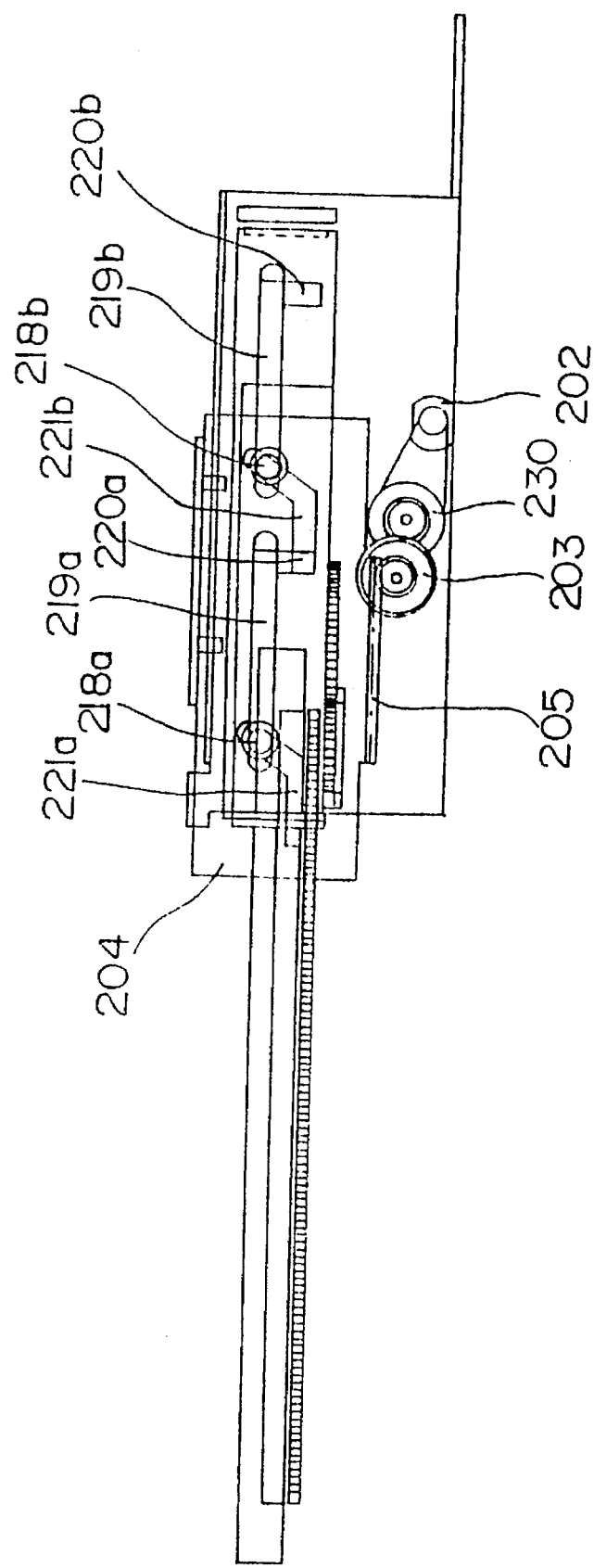
FIG. 4 is a schematic side elevation of a mini disk player including a disk tray having the guide system shown in FIG. 3.

FIGS. 4 and 5 show schematic side elevation and plan view of the mini disk tray having the above construction. As shown, driving motor 202 transmits driving force through second double gear 230, second pinion 203 and fourth rack 205 only at right side of moving plate 204.

Therefore, to prevent torsion due to transmission of driving force from only one direction, driving plate 204 adopts a construction of X-bar 301.

Hereinafter, the operation of a disk tray for a mini disk player having a guide system according to one embodiment of the present invention will be described.

First, as shown in FIG. 4, from the state that disk tray 100 is ejected, when driving motor 202 is driven to move disk tray 100 to the reproduction position thereof, second double gear 230 is rotated by driving motor 202, according to which second pinion 203 engaged therewith is rotated. In this case, the rotation shaft of second double gear 230 functions as a bearing which passes through connection hole 240. Second pinion 203 rotates to urge fourth rack 205 engaged therewith backward, and thereby driving plate 204 moves along second guide rail 208 because hooks 206 are engaged with second guide rail 208.

According to the movement of driving plate 204, tray holder 212 also moves backward because protrusions 218a and 218b are engaged in upper portions of the inclined sections of third holes 221a and 221b. In this case, because protrusions 218a and 218b move along the horizontal second holes 219a and 219b, elevator plate 211 does not move.

According as tray holder 212 moves backward, third pinion 213 fixed to tray holder 212 rolls along third rack 217 to thereby rotate third double gear 214, and then fifth rack 216 moves backward by the rotation of upper gear 214a, and then disk tray 100 moves to the reproduction position thereof. In this case, the larger the rates of the diameters of third pinion 213 and upper gear 214a to that of lower gear 214b are, the faster the relative movement of disk tray 100 to driving plate 204 is.

When protrusions 218a and 218b of tray holder 212 arrive at the rear ends of the horizontal sections of first holes 220a and 220b, they start to lower down along the vertical sections of first holes 220a and 220b and along the inclined sections of third holes 221a and 221b of driving plate 204. In result, disk tray 100 arrives at the reproduction position. In this case, because second holes 219a and 219b of elevator plate 211 do not have vertical section, elevator plate 211 also descends along with tray body 102 and tray holder 212. If elevator plate 211 is disposed so as not to move up and down or third rack 217 is formed directly on side plate 209 without elevator plate 211, third rack 217 must have large vertical width corresponding to the vertical moving distance of tray holder 212 in order to maintain the engagement between third pinion 213 and third rack 217 even after tray holder 212 descends.

In the meantime, when disk tray body 102 and tray holder 212 arrive at the reproduction position thereof, the engagements between protrusions 218a and 218b and third holes 221a and 221b are released by means of the horizontal sections of third holes 221a and 221b, so that only driving plate 204 can go on retreating without movement of tray holder 212, which retreat can be used for driving force for moving a head of the mini disk player.

When disk tray 100 is moved from the reproduction position to the ejection position again, an operation of inverse process to the above process is performed. That is, when driving motor 202 is rotated in the inverse direction, driving plate 204 is forwarded, and protrusions 218a and 218b ascend with sliding along the inclined sections of third holes 221a and 221b, thereby tray body 102, tray holder 212, and elevator plate 211 ascend all together. And then, according to the continued forward movement of driving plate 204, tray holder 212 moves forward, and disk tray 100 is moved forward rapidly to the ejection position by the cooperation of third rack 217, third pinion 213, and third double gear 214.

In the meantime, while disk tray 100 travels between the ejection position and the reproduction position as described above, the components on the disk tray are operated as follows.

First, when disk tray 100 is retreated to the reproduction position by guide system 200, tray cover 104 and moving plate 107 also move backward along with tray body 102. When moving plate 107 is in contact with stopper 122 in the course of moving backward, it is stopped at that position. At this time, first double gear 109 goes on moving backward along with tray body 102 with rolling along first rack 108.

The rolling of double gear 109 rotates first pinion 110 engaged therewith, and the rotation of first pinion 110 makes second rack 111 engaged therewith move forward, thereby making tray over 104 move forward. Tray cover 104 opens a shutter of mini disk player in the course of moving forward so that the mini disk can be recorded or reproduced. When tray cover 104 is completed to move forward to be positioned above mini disk accommodating recess, four retainers 131 in tray cover 104 urges mini disk cartridge 123 downward to hold it in its position. Meanwhile, because first pin 113 fixed at tray body 102 goes on moving backward even after moving plate 107 is stopped by stopper 122, spring 114 is elongated.

When disk tray 100 is forwarded from the reproduction position to the ejection position again, an inverse process to the above process is performed.

When disk tray 100 is moved forward from the reproduction position, tray cover 104 moves backward by the cooperation first rack 108, first double gear 109, first pinion 110, and second rack 111, and mini disk accommodating recess 106 is opened again, in the state that moving plate 107 is stopped by stopper 122 and spring 114. Tray cover 104 closes the shutter of the mini disk player in the course of moving backward.

Disk tray 100 goes on moving forward, and when second, third, and fourth pins 118, 119, and 120 melt the front ends of second, third, and fourth openings 115, 116, and 117, moving plate 107 moves forward along with disk tray 100. In this case second, third, and fourth pins 118, 119, and 120 counter against the biasing force of spring 114, and thereby the relative movement between moving plate 107 and tray body 102 is stopped. In result, the rotations of first double gear 109 and first pinion 110 also are stopped, and thereby the relative movement between tray cover 104 and tray body 102 also is stopped, so that tray cover 104 is carried forward along with tray body 102 to the ejection position.

In a disk tray for mini disk player having a guide system of the present invention as described above, the disk tray cover opens or closes the mini disk accommodating recess automatically according to the movement of the disk tray, and further opens or closes a shutter of a mini disk player, thereby an automatic loading of a mini disk is possible. Further, the disk tray guarantees a reliable loading of a mini disk with a guide system having a simple construction, thereby the manufacture of the disk tray is simple and the manufacturing cost is reduced.

Especially, in case that second double gear 230 is fitted through connection hole 240 formed in side plate 209, the disk player can be compacted, and thereby the space in order for the disk player to be installed can be minimized.

It is understood by those skilled in the art that the foregoing description is a preferred embodiment of the disclosed disk tray and that various changes and modifications may be made in the invention without departing from the spirit and scope thereof.

What is claimed is:

1. A disk tray for a mini disk player comprising:

a tray body including a mini disk accommodating recess formed at a middle part thereof, a first opening extending longitudinally near one end thereof through which a stopper fixed at a housing of the disk player protrudes, and first, second, third and fourth pins formed at an upper surface thereof;

two first guide rails longitudinally extending at the opposite sides of the mini disk accommodating recess;

a tray cover including a cover body disposed above the mini disk accommodating recess and having retainers respectively enclosing a spring, at one side of which a head opening is formed, and a second tray cover side leg disposed at the first opening side of the cover body and having a second rack formed at a side surface thereof toward the first opening and a first tray cover side leg disposed at the opposite side of the cover body to the second tray cover side leg, which are formed incorporated with the cover body and fitted respectively with the respective first guide rails to move along them;

a moving plate engaged in the first opening to move longitudinally along the first opening, and including a first rack formed at the side surface thereof toward the second rack, a fifth pin formed at the upper surface thereof, and second, third and fourth openings through which the second, third and fourth pins respectively protrude;

a spring disposed between the first and the fifth pins;

a first double gear engaged with the first rack;

a first pinion engaged with the second rack and engaged with the first double gear;

means for guiding the movement of the disk tray between a reproduction position and an ejection position thereof;

a side plate attached vertically to a lower sash of the disk player and including a second guide rail longitudinally extending at the upper end thereof, two third guide rails vertically extending respectively at the front and rear ends of the inner surface thereof, and two first holes formed at upper parts thereof and respectively having a horizontal section and a vertical section extending vertically downward from the rear end of the horizontal section, the horizontal sections of which are in series with each other;

an elevator plate fitted in the third guide rails to be elevatable along them and including two second holes extending longitudinally in series with each other, and a third rack extending longitudinally at a lower part of the inner surface thereof;

a driving plate including an upper deck, a side wall extending vertically downward from the upper plate, hooks disposed at upper parts of the inner surface of the side wall and engaged with the second guide rail to be guided along it, two third holes formed in the side wall and respectively having a horizontal section and an inclined section extending upward from the rear end of the horizontal section with inclination thereto, and a fourth rack formed at the lower end surface of the side wall;

a tray holder including a base plate through which a pore is formed, a side wall extending at right angle from the base plate, two protrusions protruding from the side wall respectively through each of the second holes and each of the first holes in turn to be engaged in an upper part of the inclined section of each of the third holes;

a fifth rack formed at a lower surface of one end of the disk tray;

a third double gear including an upper gear, a lower gear, and a rotation shaft incorporated with them, the upper gear being engaged with the fifth rack on the base plate, the lower gear being disposed under the base plate, and the rotation shaft passing through the pore;

a third pinion disposed under the base plate to be engaged with the third rack and engaged with the third pinion; and a driving means for moving the driving plate longitudinally.

2. A disk tray for a mini disk player as claimed in claim 1, wherein a connection hole is formed in the side plate, and the driving means comprises:

a second double gear including an inner gear in the side plate, an outer gear outside the side plate, and a rotation shaft passing through the connection hole and being incorporate with the inner and outer gears;

a second pinion engaged with the outer gear and the fourth rack outside of the side plate; and a driving motor for transmitting rotation force to the inner gear.

* * * * *